US009972300B2

(12) United States Patent
Raghavendra et al.

(10) Patent No.: US 9,972,300 B2
(45) Date of Patent: May 15, 2018

(54) SYSTEM AND METHOD FOR OUTLIER IDENTIFICATION TO REMOVE POOR ALIGNMENTS IN SPEECH SYNTHESIS

(71) Applicant: Interactive Intelligence Group, Inc., Indianapolis, IN (US)

(72) Inventors: E. Veera Raghavendra, Hyderabad (IN); Aravind Ganapathiraju, Hyderabad (IN)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 64 days.

(21) Appl. No.: 14/737,080

(22) Filed: Jun. 11, 2015

(65) Prior Publication Data

US 2016/0365085 A1 Dec. 15, 2016

(51) Int. Cl.
| | |
|---|---|
| *G10L 13/06* | (2013.01) |
| *G10L 13/08* | (2013.01) |
| *G10L 13/00* | (2006.01) |
| *G10L 25/51* | (2013.01) |
| *G10L 25/03* | (2013.01) |
| *G10L 15/14* | (2006.01) |
| *G10L 13/07* | (2013.01) |

(52) U.S. Cl.
CPC .............. *G10L 13/08* (2013.01); *G10L 13/00* (2013.01); *G10L 25/03* (2013.01); *G10L 25/51* (2013.01); *G10L 13/06* (2013.01); *G10L 13/07* (2013.01); *G10L 15/144* (2013.01)

(58) Field of Classification Search
None
See application file for complete search history.

(56) References Cited

U.S. PATENT DOCUMENTS

| | | | | | |
|---|---|---|---|---|---|
| 5,796,916 | A * | 8/1998 | Meredith | ................ | G10L 13/10 704/207 |
| 5,845,047 | A * | 12/1998 | Fukada | .................... | G10L 15/02 704/207 |
| 6,529,866 | B1 * | 3/2003 | Cope | .................... | G10L 21/0208 381/94.3 |
| 7,711,562 | B1 * | 5/2010 | Davis | ...................... | G10L 13/00 704/258 |
| 7,979,280 | B2 * | 7/2011 | Wouters | ................ | G10L 13/033 704/260 |
| 9,275,631 | B2 * | 3/2016 | Tachibana | ............... | G10L 13/07 |

(Continued)

OTHER PUBLICATIONS

PCT/US2015/035342, International Searching Authority, Written Opinion of the International Searching Authority, dated Nov. 19, 2015.

(Continued)

*Primary Examiner* — Richard Zhu
(74) *Attorney, Agent, or Firm* — Lewis Roca Rothgerber Christie LLP (57) ABSTRACT

A system and method are presented for outlier identification to remove poor alignments in speech synthesis. The quality of the output of a text-to-speech system directly depends on the accuracy of alignments of a speech utterance. The identification of mis-alignments and mis-pronunciations from automated alignments may be made based on fundamental frequency methods and group delay based outlier methods. The identification of these outliers allows for their removal, which improves the synthesis quality of the text-to-speech system.

14 Claims, 8 Drawing Sheets

(56) References Cited

U.S. PATENT DOCUMENTS

2003/0125949 A1 7/2003 Okutani et al.
2010/0312562 A1 12/2010 Wang et al.
2013/0262096 A1 10/2013 Wilhelms-Tricarico et al.

OTHER PUBLICATIONS

PCT/US2015/035342, International Searching Authority, International Search Report, dated Nov. 19, 2015.
International Preliminary Report on Patentability issued Aug. 1, 2017 for PCT Application No. US15/35342 (27 pages).

\* cited by examiner

SYSTEM AND METHOD FOR OUTLIER IDENTIFICATION TO REMOVE POOR ALIGNMENTS IN SPEECH SYNTHESIS

BACKGROUND

The present invention generally relates to speech synthesis systems and methods, as well as telecommunications systems and methods. More particularly, the present invention pertains to text-to-speech systems.

SUMMARY

A system and method are presented for outlier identification to remove poor alignments in speech synthesis. The quality of the output of a text-to-speech system directly depends on the accuracy of alignments of a speech utterance. The identification of mis-alignments and mis-pronunciations from automated alignments may be made based on fundamental frequency methods and group delay based outlier methods. The identification of these outliers allows for their removal, which improves the synthesis quality of the text-to-speech system.

In one embodiment, a method is presented for identifying outlying results in audio files used for model training, in a text-to-speech system, applying fundamental frequency, the method comprising the steps of: extracting values of the fundamental frequencies from the audio files; generating alignments using the extracted values from the audio files; separating out instances of phonemes; determining, for each separated instance, an average fundamental frequency value and an average duration value; identifying an instance as an outlier, wherein an outlier is identified if: the phoneme is a vowel; the average fundamental frequency of an instance is less than a predetermined value; the duration of the instance is greater than twice the average duration of a phoneme; and the duration of the instance is less than half of the average duration of a phoneme; and identifying a sum of outliers for each sentence in the audio files, wherein if the sentence has more than a number of outliers, discarding the sentence in the audio files from model training.

In another embodiment, a method is presented for identifying outlying results in audio files used for model training, in a text-to-speech system, applying group delay algorithms, the method comprising the steps of: generating alignments of the audio files at a phoneme level; generating alignments of the audio files at a syllable level; adjusting the alignments at the syllable level using group delay algorithms; separating each syllable from the audio files into a separate audio file; generating, for each separate audio file, phonemes of the separate audio files using phoneme boundaries for each syllable and an existing phoneme model; determining a likelihood value of each generated phoneme, wherein if the likelihood value meets a criteria, identifying the generated phoneme as an outlier; and identifying a sum of outliers for each sentence in the audio files, wherein if the sentence has more than a number of outliers, discarding the sentence from model training.

In another embodiment, a method is presented for synthesizing speech in a text-to-speech system, wherein the system comprises at least a speech database, a database capable of storing Hidden Markov Models, and a synthesis filter, the method comprising the steps of: identifying outlying results in audio files from the speech database and removing the outlying results before model training; converting a speech signal from the speech database into parameters and extracting the parameters from the speech signal; training Hidden Markov Models using the extracted parameters from the speech signal and using the labels from the speech database to produce context dependent Hidden Markov Models; storing the context dependent Hidden Markov Models in the database capable of storing Hidden Markov Models; inputting text and analyzing the text, wherein said analyzing comprises extracting labels from the text; utilizing said labels to generate parameters from the context dependent Hidden Markov Models; generating an other signal from the parameters; inputting the other signal and the parameters into the synthesis filter; and producing synthesized speech as the other signal passes through the synthesis filter.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With the availability of higher processing memories and storage capabilities, demand for speech applications is also increasing for mobile phones and hand-held devices. Requests for speech interfaces are also increasing in commercial applications. The development of speech interfaces for applications is generally focused on text-to-speech synthesis and, in particular, the usage of Hidden Markov Models (HMMs) based approaches, such as statistical parametric speech synthesis.

HMM based approaches have shown that it is possible to produce natural-sounding synthesized speech. This is highly desirable as the synthesized speech sounds less robotic and more human. In a statistical parametric approach, metrics, such as duration, fundamental frequency (F0), and Mel-cepstral coefficients (MCEPs), are extracted from the speech signal and modeled. During synthesis, trained models are then used to generate sequences of parameters from sentence HMMs.

Creating the models for duration, F0 and MCEPs depend on the alignments of the audio to the phonemes. Highly accurate alignments will produce greater synthesis quality, while poor alignments decrease the quality of synthesized speech. The alignments generated by the system are used to produce context labels, but problems arise if a mismatch occurs. The generated alignments may have mis-alignments due to mismatch between audio and transcription and speaker variability. Wrong alignments cause bad prosody and ad-hoc frequency or spectral variations, thus significantly decreasing the quality of the speech synthesis.

Figure 1A:
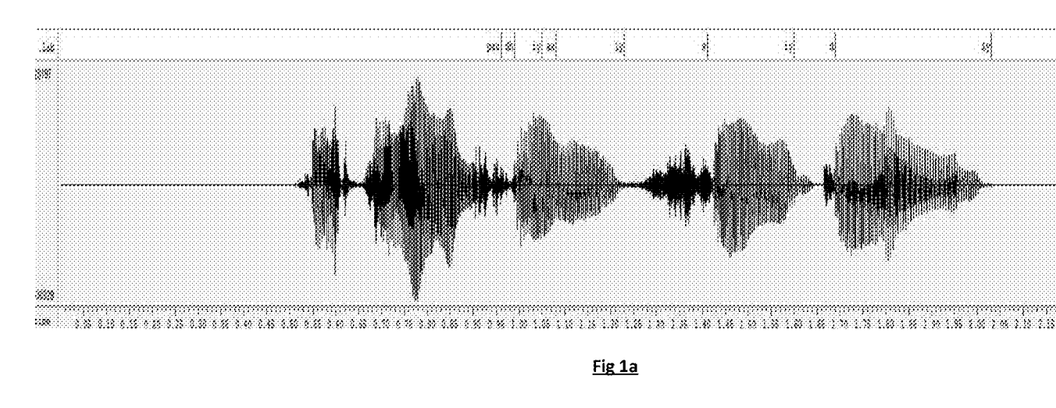
FIG. 1a is a diagram illustrating an embodiment of a mis-alignment.
Figure 1B:
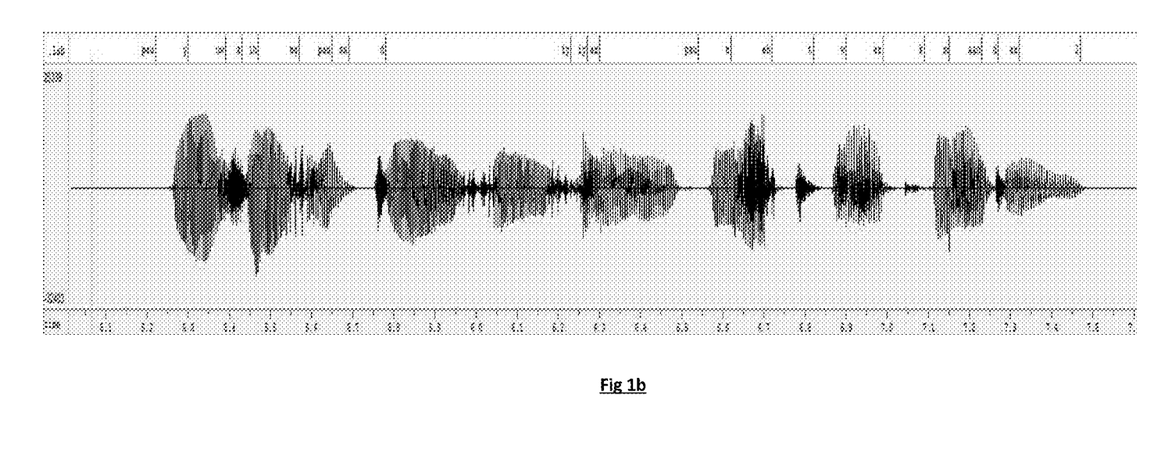
FIG. 1b is a diagram illustrating an embodiment of a mis-alignment.
Figure 1C:
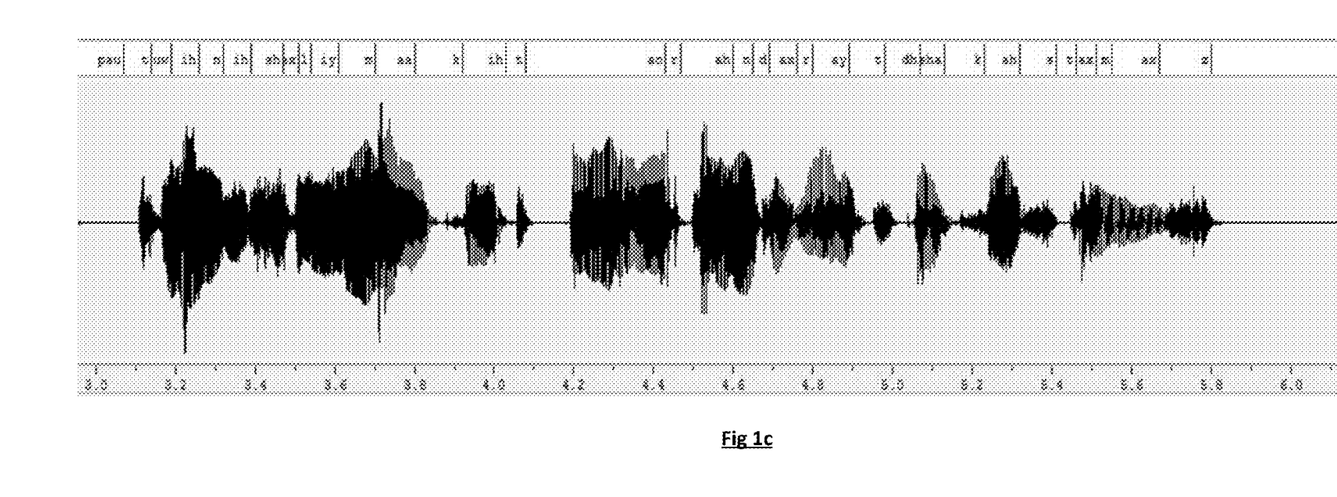
FIG. 1c is a diagram illustrating an embodiment of a mis-pronunciation.

FIGS. 1a-1c illustrate general examples of mis-pronunciation and mis-alignments and the effects on speech synthesis. In one example, FIG. 1(a) illustrates that all the phonemes have been moved further in time and the word "the" has been pronounced as [dh] [ax]. Actual pronunciations show [dh] [iy]. In another example, FIG. 1(b) illustrates the mis-alignment of the phoneme [iy]. In yet another example, FIG. 1(c) illustrates an instance of the speaker pronouncing the word "or" as [ow]. These examples of mis-alignments and mis-pronunciations produce the wrong models, which results in the models predicting wrongly during synthesis. In order to circumvent these issues, systems and methods for outlier identification are presented to remove poor alignments in text-to-speech systems.

Fundamental Frequency Based Outlier Detection

Figure 2A:
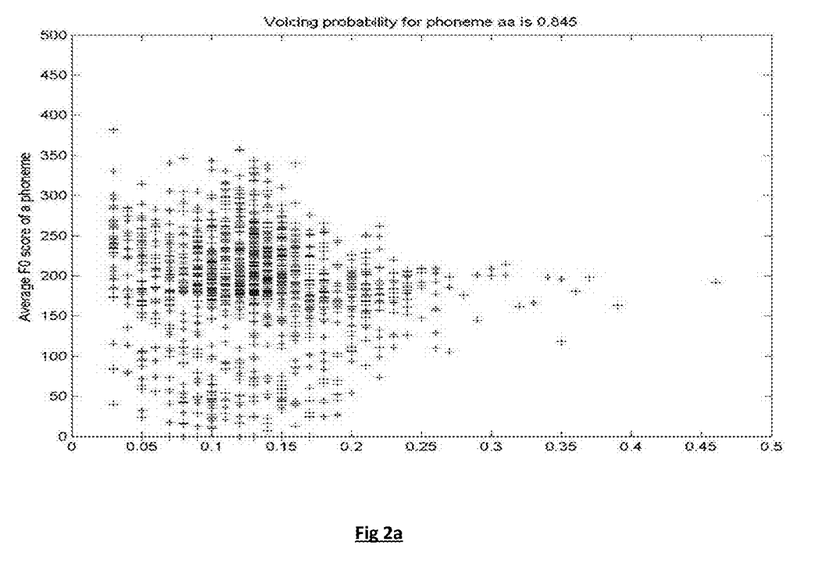
FIG. 2a is a diagram illustrating an embodiment of an average F0 and duration plot.
Figure 2B:
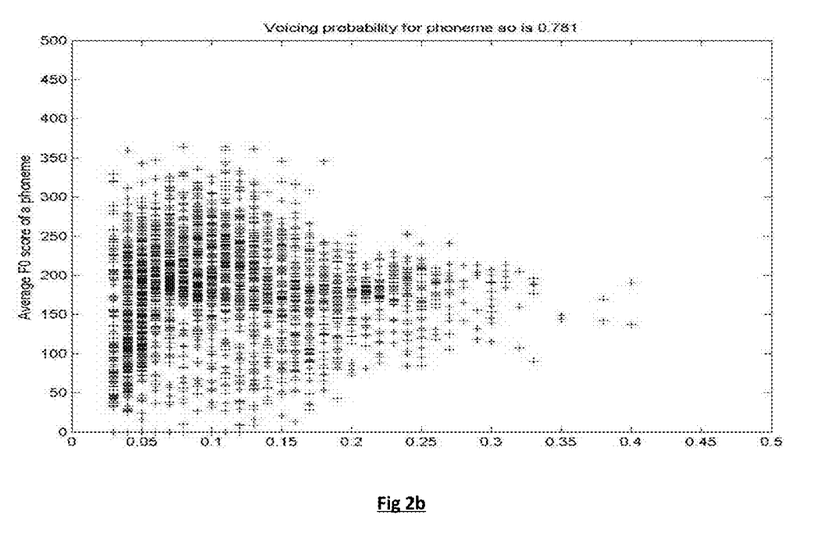
FIG. 2b is a diagram illustrating an embodiment of an average F0 and duration plot.
Figure 2C:
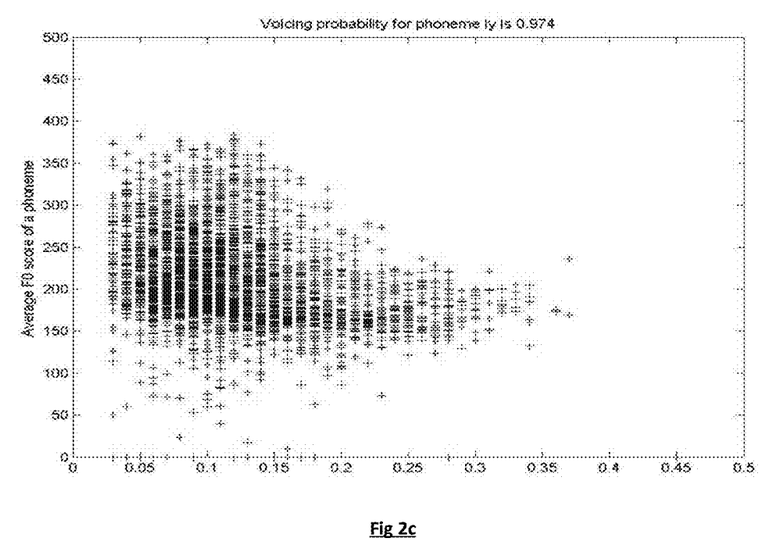
FIG. 2c is a diagram illustrating an embodiment of an average F0 and duration plot.
Figure 2D:
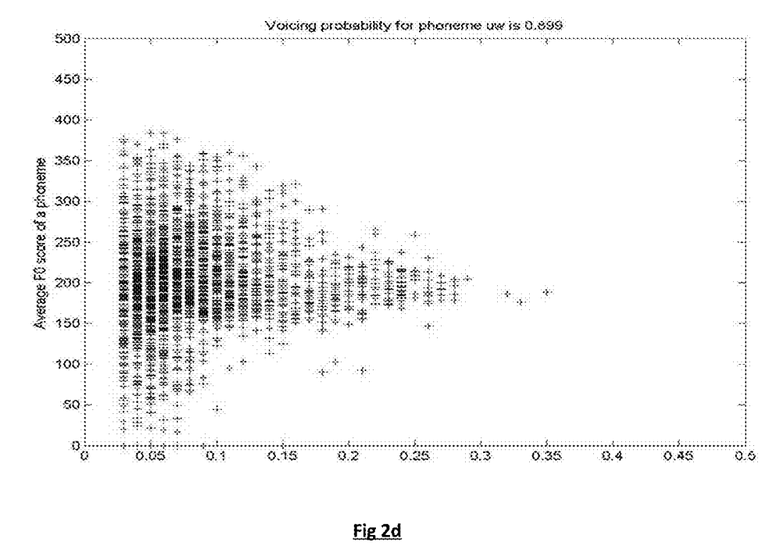
FIG. 2d is a diagram illustrating an embodiment of an average F0 and duration plot.

Fundamental frequency (F0) may be used to determine the frequency of voice sounds from a person. F0 also indicates the frequency of the vibration of the vocal folds. In a general example, an adult female speaker tends to have a F0 ranging from 165 Hz to 225 Hz. Values for F0 outside of this range for a female speaker may be indicative of outliers. Using the general example of the adult female speaker, FIGS. 2a-2d display average F0 and duration plots for long-vowels that indicate mis-alignment and/or mis-pronunciation. In these figures, duration is indicated on the horizontal axis while the average F0 score of phoneme is indicated on the vertical axis of the plots. FIG. 2a illustrates the long-vowel [aa], FIG. 2b illustrates [ao], FIG. 2c illustrates [iy], and FIG. 2d illustrates [uw]. Many instances have an average F0 value below 165, as seen in each of FIGS. 2a-2d. The occurrence of an F0 value below 165 Hz may be caused by the transition from vowel to an unvoiced consonant or vice versa. In some instances, the duration of the phoneme is beyond 250 ms, which can also be seen in each of FIGS. 2a-2d.

Figure 3:
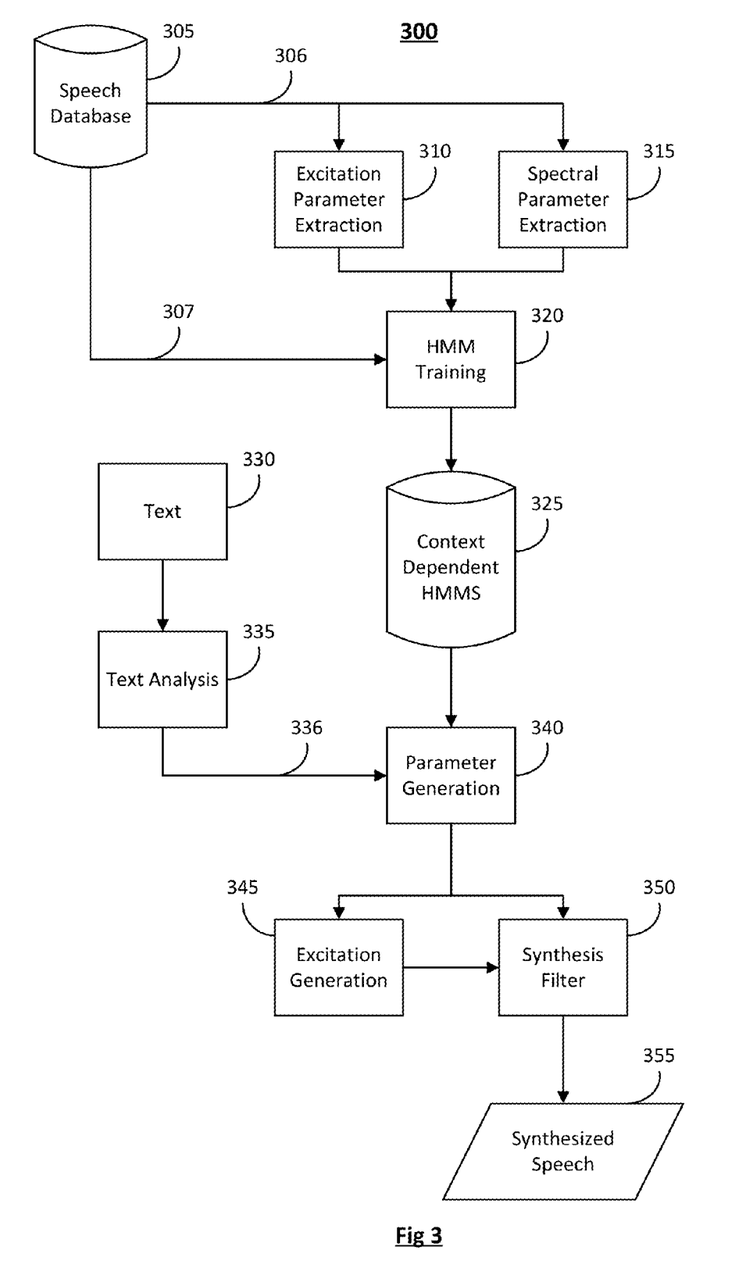
FIG. 3 is a diagram illustrating an embodiment of an HMM based TTS system.

FIG. 3 is a diagram illustrating an embodiment of a Hidden Markov Model (HMM) based Text to Speech (TTS) system, indicated generally at 300. An embodiment of an exemplary system may contain two phases, for example, the training phase and the synthesis phase.

The Speech Database 305 may contain an amount of speech data for use in speech synthesis. During the training phase, a speech signal 306 is converted into parameters. The parameters may be comprised of excitation parameters and spectral parameters. Excitation Parameter Extraction 310 and Spectral Parameter Extraction 315 occur from the speech signal 306 which travels from the Speech Database 305. A Hidden Markov Model 320 may be trained using these extracted parameters and the Labels 307 from the Speech Database 305. Any number of HMM models may result from the training and these context dependent HMMs are stored in a database 325.

The synthesis phase begins as the context dependent HMMs 325 are used to generate parameters 340. The parameter generation 340 may utilize input from a corpus of text 330 from which speech is to be synthesized from. The text 330 may undergo analysis 335 and the extracted labels 336 are used in the generation of parameters 340. In one embodiment, excitation and spectral parameters may be generated in 340.

The excitation parameters may be used to generate the excitation signal 345, which is input, along with the spectral parameters, into a synthesis filter 350. Filter parameters are generally Mel frequency cepstral coefficients (MFCC) and are often modeled by a statistical time series by using HMMs. The predicted values of the filter and the fundamental frequency as time series values may be used to synthesize the filter by creating an excitation signal from the fundamental frequency values and the MFCC values used to form the filter.

Synthesized speech 355 is produced when the excitation signal passes through the filter. The formation of the excitation signal 345 is integral to the quality of the output, or synthesized, speech 355.

Figure 4:
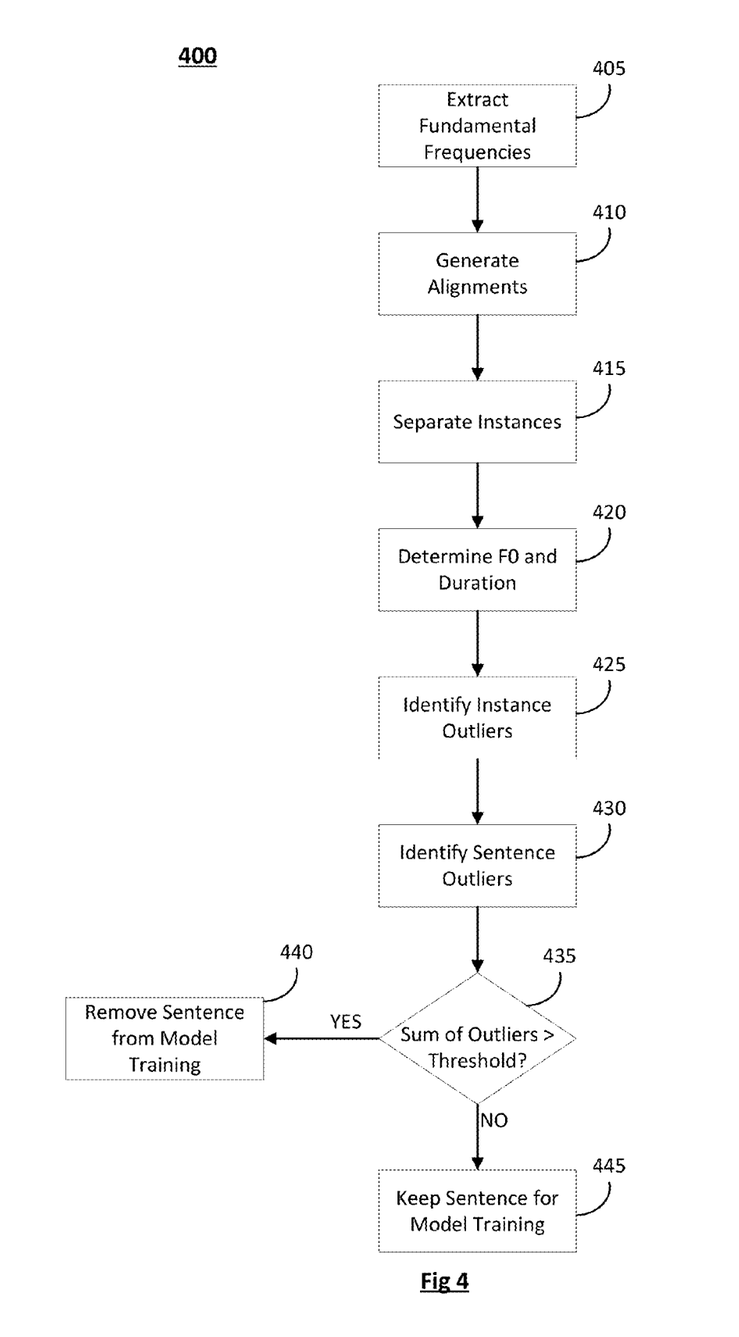
FIG. 4 is a flowchart illustrating a process of an embodiment for the detection of F0 based outliers.
Figure 6:
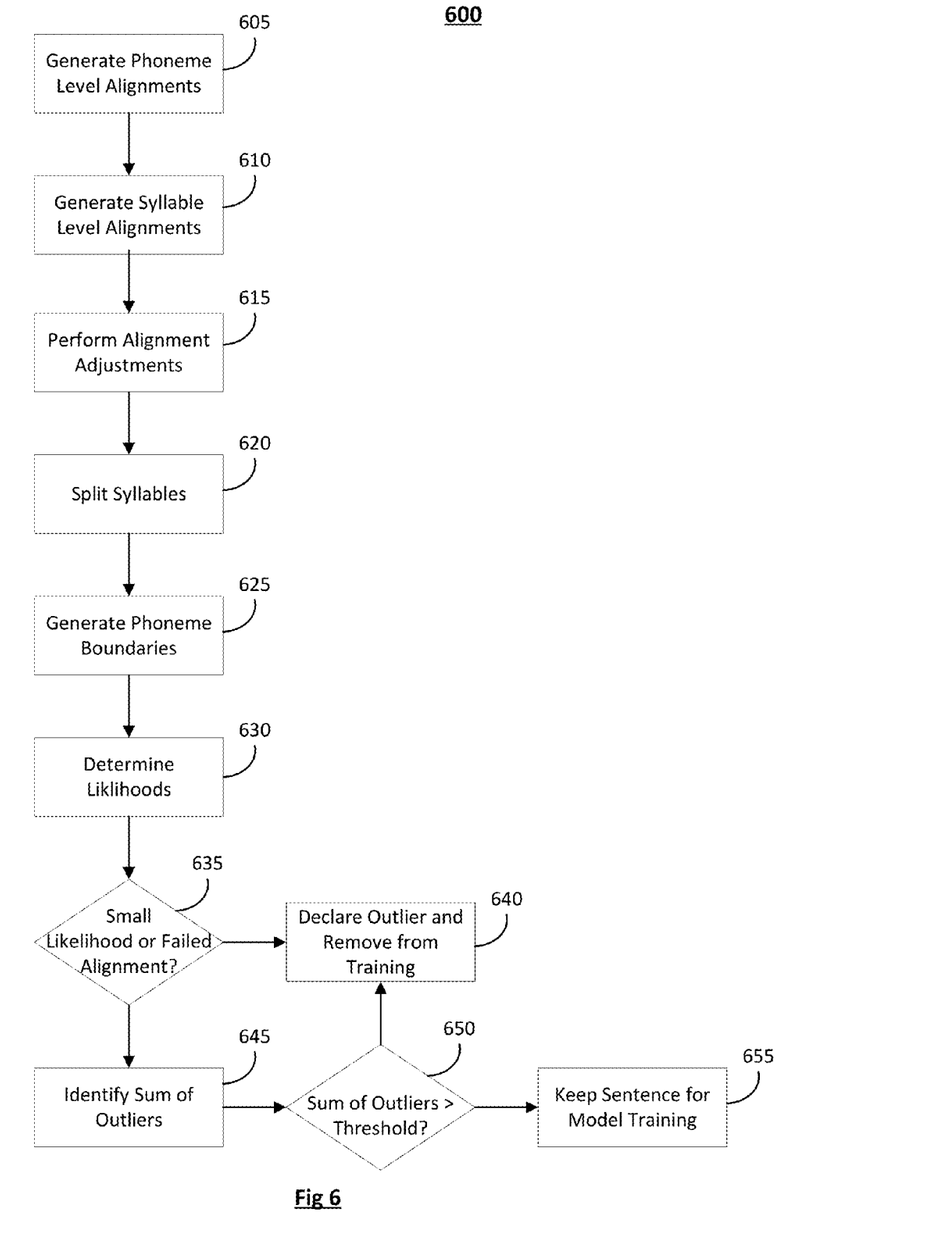
FIG. 6 is a flowchart illustrating a process of an embodiment for the detection of group delay based outliers.

In an embodiment, outlier detection occurs prior to the training of the HMM 320 during the training phase. The data in the speech database is optimized with the detection of outliers within the database and thus, the training of the HMM 320 results in greater accuracy. FIGS. 4 and 6 describe embodiments in greater detail for the process of detecting the outliers, specifically, the detection of fundamental frequency based outliers and the detection of group delay based outliers, respectively.

FIG. 4 is a flowchart illustrating a process of an embodiment for detection of fundamental frequency based outliers, indicated generally at 400.

In operation 405, fundamental frequencies are extracted. For example, a pitch tracking tool (e.g., ESPS) may be used to perform signal analysis. Control is passed to operation 410 and process 400 continues.

In operation 410, alignments are generated. For example, a speech recognition system (e.g., HTK) may be used to perform the process of alignment generation. Control is passed to operation 415 and process 400 continues.

In operation 415, instances are separated. For example, instances of phonemes are separated out. An instance may describe an occurrence of a phoneme within the audio file. Control is passed to operation 420 and process 400 continues.

In operation 420, fundamental frequency and duration are determined. For example, an average fundamental frequency value and an average duration value may be determined for each separated instance. Control is passed to operation 425 and process 400 continues.

In operation 425, outliers are identified for instances. For example, in order to identify outliers, criteria must be met. Several non-limiting examples of criteria may include: phonemes presenting as vowels, the average F0 of an instance being less than a predetermined value, the duration of the instance presenting at greater than twice the average duration of a phoneme, and the duration of the instance presenting at less than half of the average duration of a phoneme. A predetermined value may be empirically chosen so that spurious F0 estimates that arise because of poor alignment can be identified. In one example, a predetermined value of 40 is used, where 40 represents an empirically chosen value for a specific instance. Control is passed to operation 430 and process 400 continues.

In operation 430, outliers are identified for sentences. For example, the total number of outliers of the instances within a sentence is determined. Control is passed to operation 435 and process 400 continues.

In operation 435, it is determined whether the sum of outliers meets the threshold. If it is determined that the sum of outliers is meets a threshold, control is passed to operation 440 and process 400 continues. If it is determined that the sum of outliers does not meet the threshold, control is passed to operation 445 and process 400 continues.

The determination in operation 435 may be made based on any suitable criteria. For example, the threshold for the number of outliers may be an empirically chosen value that provides a balance of discarded recordings versus retaining too many recordings with poor alignments. In one example, the threshold may represent five outliers and if the total number of outliers determined in operation 430 meets the threshold, the sentence will be removed from model training.

In operation 440, the sentence is removed from model training and the process 400 ends.

In operation 445, the sentence is retained for model training and the process 400 ends.

Group Delay Based Outlier Detection

Figure 5:
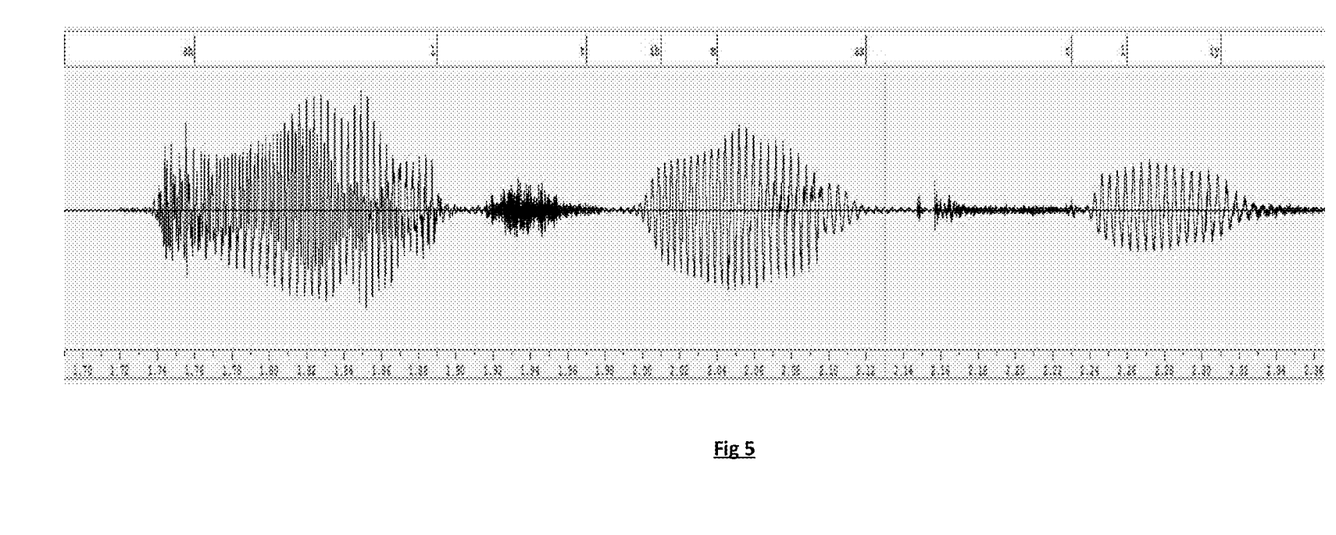
FIG. 5 is a diagram illustrating an embodiment of phoneme boundaries.

The group delay approach aids in segmentation of the continuous speech into syllable boundaries using peaks and valleys in the group delay domain. Phoneme boundaries can be aligned with group-delay based syllables using an audio alignment tool (e.g. HVite). If the likelihood of the phoneme is very low, or it could not align with a larger beam width, then that phoneme may be considered an outlier. FIG. 5 is an example illustration of the phoneme boundaries for the word "ultimately". The speaker has pronounced the word as "automately", however. When the phonemes [ah], [l] aligned with syllable [al-l], the likelihood of the phoneme [l] becomes very low and results in a failure to adjust the boundary.

FIG. 6 is a flowchart illustrating a process of an embodiment for detection of group delay based outliers, indicated generally at 600.

In operation 605, phoneme level alignments are generated. For example, a speech recognition system (e.g., HTK) may be used to perform the process of alignment generation. Control is passed to operation 610 and process 600 continues.

In operation 610, syllable level alignments are generated using group delay. For example, a speech recognition system (e.g. HTK) may be used to perform the process of alignment generation along with a phoneme model. The phoneme model may comprise a previously trained acoustic model using training date. Control is passed to operation 615 and process 600 continues.

In operation 615, alignment adjustments are performed. For example, group delay algorithms may be used to perform the adjustments of the syllable alignments. Control is passed to operation 620 and process 600 continues.

In operation 620, syllables are split. For example, syllables may be split into separate audio files. These separate files may be used for further analysis such as pooling information from other like syllables. Control is passed to operation 625 and process 600 continues.

In operation 625, phoneme boundaries are generated. For example, phoneme boundaries may be generated for each audio file generated in operation 620 using the existing phoneme model, wherein the existing phoneme model comprises a previously trained acoustic model using training data. Control is passed to operation 620 and process 600 continues.

In operation 630, likelihood values are determined. For example, likelihood values are determined for each generated phoneme. The likelihood may comprise a log-likelihood value. Control is passed to operation 635 and process 600 continues.

In operation 635, it is determined whether or not the alignment has failed or the value of the likelihood is small. If it is determined that the alignment has failed or the value of the likelihood is small, control is passed to operation 640 and the process 600 continues. If it is determined that the alignment has not failed or the value of the likelihood is not small, control is passed to operation 645 and the process 600 continues.

The determination in operation 635 may be made on any suitable criteria. For example, this may be very tool specific and is chosen empirically.

In operation 640, an outlier is declared and the sentence is removed from training and the process ends.

In operation 645, the sum of outliers is identified. For example, the sum of the outliers from the sentence is determined. Control is passed to operation 650 and the process 600 continues.

In operation 650, it is determined if the sum of outliers meets a threshold. If it is determined that the sum of outliers does not meet the threshold, control is passed to operation 650 and the process 600 continues. If it is determined that the sum of outliers meets the threshold, control is passed back to operation 640 and the process 600 continues.

The determination in operation 650 may be made based on any suitable criteria. For example, the threshold may be an empirically chose value to provide a balance of retained versus discarded recordings. In an embodiment, the threshold value is three. Thus, if the sentence is determined to have more than three outliers, the sentence will not be used for model training.

In operation 655, the sentence is retained for model training and the process 600 ends.

Use of Outlier Detection in Speech Synthesis

The previously described embodiments of outlier detection may be applied in an HMM-based speech synthesis system as described in FIG. 4. During the HMM model training phase, spectrum and excitation parameters are extracted from a speech database and modeled by context dependent HMMs. During the synthesis phase, context dependent HMMs are concatenated according to the text to be synthesized.

HMM models are trained using HMM-based speech synthesis system (HTS) framework. HTS is a modified version of a Hidden Markov Model toolkit and a signal processing tool such as the Signal Processing Tool Kit (SPTK). During training, spectrum and excitation parameters are extracted from the annotated speech database and converted into a sequence of observed feature vectors which are modeled by a corresponding sequence of HMMs. Each HMM corresponds to a left-to-right no-skip model, where each output vector is composed of two streams: spectrum and excitation. The spectrum stream is represented by mel-cepstral coefficients, including energy coefficients and the related delta and delta-delta coefficients. The excitation stream is represented by Log F0 and the related delta and delta-delta coefficients.

HMMs have state duration densities to model the temporal structure of speech. As a result, HTS models utilize not only spectrum parameters, but also F0 and duration in a unified framework of HMM. Mel-ceptral coefficients are modeled by continuous HMMs and F0s are modeled by multi-space probability distribution HMM (MSD-HMM).

In order to capture the phonetic and prosody co-articulation phenomena, context-dependent phone models may be used. State tying based on decision-tree and minimum description length criterion is applied to overcome the problem of data sparseness in training Stream-dependent models are the built to cluster the spectral, prosodic, and duration features into separated decision trees.

During synthesis, an arbitrarily given text to be synthesized is converted to a context-based label sequence. According to the label sequence, a sentence HMM is constructed by concatenating context dependent HMMs. State durations of the sentence HMM are determined so as to maximize the output probability of state durations. A sequence of mel-cepstral coefficients and log F0 values, including voiced/unvoiced decisions, is determined so that the output probability for the HMM is maximized using a speech parameter generation algorithm.

The main feature of the system is the use of dynamic feature: by inclusion of dynamic coefficients in the feature vector. The speech parameter sequence generated in synthesis is constrained to be realistic, as defined by the statistical parameters of the HMMs. Speech waveform is synthesized directly from the generated mel-cepstral coefficients and F0 values, wherein the synthesis utilizes a MLSA filter.

Mel-cepstral distortion (MCD) may be used to evaluate the speech synthesis. MCD is an objective error measure used to compute cepstral distortion between original and synthesized MCEPs and F0 values. A lower MCD value indicates high quality synthesized speech. The MCD may be defined as a Euclidean Distance measure, using the following mathematical equation:

$$mcd=(10/\ln 10)*\sqrt{2*\Sigma_{i=1}^{41}(mc_i^t-mc_i^e)^2}$$

Where $mc_i^t$ and $mc_i^e$ denote the target and estimated F0 and MCEPs, respectively.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for generating synthesized speech using parametric models, the method comprising the steps of:
   a. selecting sentences from a database of speech audio files, wherein the sentences comprise a plurality of phonemes;
   b. identifying a total sum of instance outliers for each of the plurality of phonemes, wherein the instance outliers comprise fundamental frequency based outliers and group delay based outliers;
   c. ignoring the sentences wherein the total sum of instance outliers exceeds a sentence outlier threshold and retaining sentences wherein the total sum of instance outliers meets the sentence outlier threshold;
   d. using the retained sentences to generate trained Hidden Markov Models;
   e. generating a plurality of context dependent Hidden Markov Models using the trained Hidden Markov Models, spectrum parameters, and excitation parameters, wherein the spectrum parameters and excitation parameters are extracted from the database of speech audio files using the trained Hidden Markov Models;
   f. analyzing a selected text and generating text excitation parameters and text spectral parameters using the plurality of context dependent Hidden Markov Models;
   g. generating a text excitation signal using the text excitation parameters; and
   h. generating a synthesized speech waveform by passing the text excitation signal and text spectral parameters into a synthesis filter.

2. The method of claim 1 wherein the step of identifying the fundamental frequency based outliers further comprises:
   a. performing signal analysis using a pitch tracking tool to extract the fundamental frequency of each of the sentences;
   b. generating alignments using a speech recognition tool including a Hidden Markov Model Toolkit (HTK);
   c. separating instances of the plurality of phonemes;
   d. determining a first fundamental frequency and a duration from each of the separated instances of the plurality of phonemes; and
   e. identifying instance outliers for each of the separated instances of the plurality of phonemes, wherein the instance outliers exceed an instance outlier threshold.

3. The method of claim 2, wherein the instance outlier threshold is selected to identify phonemes presenting as vowels.

4. The method of claim 2, wherein the instance outlier threshold is a predetermined fundamental frequency value, and an average of the first fundamental frequency of the separated instances of the plurality of phonemes is less than the predetermined fundamental frequency value.

5. The method of claim 4 wherein the predetermined fundamental frequency value is an empirically chosen value for each of the separated instances of the plurality of phonemes.

6. The method of claim 2, wherein the instance outlier threshold is a duration when each of the separated instance presents at greater than twice an average duration of the phoneme.

7. The method of claim 2, wherein the instance outlier threshold is a duration when each of the separated instance presents at less than half of the average duration of a phoneme.

8. The method of claim 1 wherein the step of identifying group delay based outliers further comprises:
   a. generating syllable alignments for each of the plurality of phonemes using a speech recognition system and a phoneme model;
   b. making adjustments to the syllable alignments using group delay algorithms;
   c. splitting the syllable alignments and analyzing the split syllable assignments for pooling information;
   d. generating phoneme boundaries for each of the split syllables using the phoneme model;
   e. determining likelihood values for each of the generated phoneme boundaries, wherein the likelihood values comprise log-likelihood values;
   f. determining whether generating the syllable alignment has failed or if the likelihood value is too small; and
   g. identifying a sum of instance outliers for each of the generated phoneme boundaries.

9. The method of claim 8, wherein the phoneme model comprises a previously trained acoustic model using training data.

10. The method of claim 1, wherein the generating the plurality of context dependent Hidden Markov Models using the trained Hidden Markov Models further comprises extracting the spectrum parameters and the excitation parameters from the database of speech audio files and converting the spectrum parameters and the excitation parameters into a sequence of observed feature vectors.

11. The method of claim 1, wherein the generating the text excitation parameters and the text spectral parameters further comprises the step of converting the selected text to a context-based label sequence.

12. The method of claim 1, wherein the synthesis filter comprises filter parameters selected from the group consisting of Mel frequency cepstral coefficients, Mel frequency cepstral coefficients modeled by a statistical time series by using the plurality of context dependent Hidden Markov Models, and a first fundamental frequency.

13. The method of claim 1, wherein the generating the synthesized speech waveform further comprises:
 a. constructing a sentence Hidden Markov Model by concatenating a plurality of the context dependent Hidden Markov Models; and
 b. determining a state duration for the sentence Hidden Markov Model, wherein the state duration is calculated to maximize an output probability of the state duration.

14. The method of claim 13, wherein the output probability comprises a sequence of Mel frequency cepstral coefficients and log of first fundamental frequency values of separated instances of the plurality of phonemes.

* * * * *